Sept. 8, 1936.  M. A. BOSTWICK  2,053,416
DIRECTIONAL RELAY
Filed July 1, 1932
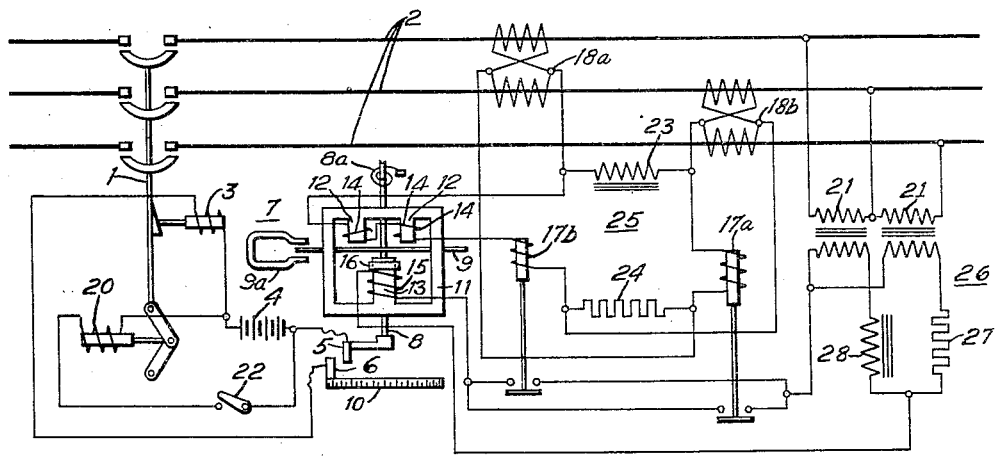
WITNESSES:
R. S. Williams
Geo. O. Harrison.
INVENTOR
Myron A. Bostwick.
BY
ATTORNEY Patented Sept. 8, 1936

2,053,416

UNITED STATES PATENT OFFICE 2,053,416

DIRECTIONAL RELAY

Myron A. Bostwick, North Arlington, N. J., assignor to Westinghouse Electric & Manufacturing Company, East Pittsburgh, Pa., a corporation of Pennsylvania Application July 1, 1932, Serial No. 620,522

5 Claims. (Cl. 175—294)

My invention relates to protective apparatus for electric circuits and particularly to network protective apparatus operating upon the phase-sequence principle, as disclosed in the copending application of R. E. Powers and H. R. Searing, Serial No. 648,207, filed December 21, 1932, and assigned to the Westinghouse Electric and Manufacturing Company.

In the above-mentioned application of R. E. Powers and H. R. Searing there is disclosed a novel form of network system in which the opening operation of the network protectors is controlled by means of single-phase directional elements energized in accordance with positive sequence power quantities, operating in conjunction with instantaneous overcurrent elements responsive to positive and negative sequence currents. In the operation of the Powers and Searing system, the network protectors connected to any feeder may be opened at will by opening the feeder circuit breaker and artificially circulating negative sequence currents in the feeder, as explained in the above-mentioned application. Under these conditions, the directional elements respond to the reversed flow of positive sequence power, and the negative sequence overcurrent elements respond to the negative sequence current, to cause the network protectors to open. However, reversed power flow at various supply points of the network occurs frequently because of regenerative operation of motors, variations of load distribution on the network if supplied from more than one source, etc., and if, during such a reversed power condition, a sufficiently unbalanced momentary current flows, one or more of the protectors open. It is, therefore, desirable to provide some means of distinguishing between the momentary negative sequence current flow which may occur accidentally during reversed power conditions, and the sustained negative sequence current flow artificially established to cause the protectors to open. In the former case it is desirable to prevent the opening of the protectors.

It is accordingly an object of my invention to provide an improvement of the above-mentioned invention of R. E. Powers and H. R. Searing which shall operate to reduce the number of unnecessary protector operations.

Another object of my invention is to provide a novel arrangement of phase-sequence protective apparatus of general utility.

Other objects of my invention will become evident from the following detailed description taken in conjunction with the accompanying drawing, in which the single figure is a diagrammatic view of a protective arrangement embodying my invention.

Referring to the drawing, a circuit breaker 1 is provided for connecting an alternating-current source (not shown) and a polyphase load circuit 2. The circuit breaker 1 is provided with a closing coil 20 connected to suitable energizing means, shown as a battery 4, by a switch 22, and with a trip coil 3 connected to the battery 4 in a circuit which includes the contact members 5 and 6 of an induction disc relay, indicated diagrammatically at 7. For simplicity, I have illustrated the contact members of the relay 7 as a movable contact member 5 and a stationary contact member 6, but it will be understood that other arrangements known in the art may be used in practice.

The contact member 5 is driven through any suitable mechanism from a pivotally mounted spindle 8 upon which is rigidly secured an induction disc 9. The contact member 6 is secured upon an index cylinder 10 adjustably mounted, by means not shown, co-axially with the arc of travel of the contact member 5, so that the contact member 6 may be secured in any of a number of positions along the arc. A biasing spring 8a is provided for rotating the spindle 8 so that a moving part of the relay is resiliently held against a stop member (not shown) in a position such that the contact members 5 and 6 are separated.

The induction disc 9 is positioned in the usual manner so that it may be influenced by an operator comprising a driving magnet 11 and a drag magnet 9a. The driving magnet 11 is preferably of laminated construction and is provided with the usual current poles 12 and potential pole 13. The parts of the driving magnet 11 connecting the current poles 12 and the potential pole 13 are of restricted cross section to limit the flux which may be developed in the poles.

A pair of current windings 14 are mounted upon the current poles 12 and a voltage winding 15 is mounted on the potential pole 13. A lag loop or shading coil 16 is mounted upon the potential pole 13 of the driving magnet 11, to modify the tripping characteristic of the relay in a well known manner.

The current windings 14 and the voltage winding 15 are connected to suitable phase-sequence apparatus to be energized in accordance with positive sequence current and voltage, respectively, as explained in the above-mentioned application of R. E. Powers and H. R. Searing. In order to energize the current phase sequence apparatus, a pair of current transformers 18a, energized in accordance with the currents in adjacent phase conductors of circuit 2, is provided for obtaining a resultant current depending in phase relationship and magnitude upon the currents in the associated phase conductors. A similar pair of current transformers 18b is provided for obtaining a resultant current depending in phase relationship and magnitude upon the current in the remaining conductor of circuit 2 and one of the conductors associated with current transformers 18a.

The secondary windings of the current transformers 18a are connected in opposition and the circuit so formed is connected to opposite junction points of a quadrilateral network designated generally by the reference numeral 25. Similarly, the secondary windings of current transformers 18b are connected in opposition and to the remaining junction points of the network 25.

The four branches of the quadrilateral network 25 include a reactor 23, a resistor 24, the coil of an over-current relay 17a and the current windings 14 of relay 7 and the coil of an over-current relay 17b in series, respectively.

The constants of the various elements included in the quadrilateral network 25 are related as follows: The reactance and resistance of the coil of relay 17a are equal respectively to the sum of the reactances and the sum of the resistance of the coil of relay 17b and the current coils 14 of the relay 7. The vector sum of the impedance of relay 17a plus the impedance of reactor 24 must equal the vector sum of the impedance relay 17b, plus the impedance of relay 14 plus the impedance of resistor 24. The angle between these two impedance vectors must be 60°.

The relationship of currents in such a quadrilateral network is described in U. S. Patent 1,726,928 to H. P. Sleeper, et al, issued September 3, 1929 upon an application Serial No. 685,060 filed January 8, 1924 and assigned to the Westinghouse Electric & Manufacturing Company.

As explained in the above-mentioned patent, the currents in the branches of the quadrilateral corresponding to branches in which the coils of relays 17a and 17b are included, are directly proportional to symmetrical components of the polyphase currents supplied to the network. For one phase-rotation of currents in the circuit 2, the coil of relay 17a is energized in accordance with a negative phase-sequence component and the coil of relay 17b is energized in accordance with a positive phase-sequence component. For the opposite phase rotation of current in the circuit 2, the coils of relay 17a and 17b are energized respectively, in accordance with positive and negative phase-sequence components.

The voltage winding 15 of the relay 7 is connected, in a circuit which includes the contact members of the over-current relays 17a and 17b in parallel, to a voltage phase-sequence network 26.

The voltage phase-sequence network 26 comprises a resistor 27 and a reactor 28. The reactor 28 has the same absolute impedance as the resistor 28, but has reactance and resistance of such ratio that its current, when the system is in operation, lags its terminal voltage by a phase angle of 60°. The network 26 is energized from the conductors of circuit 2 by means of a pair of voltage transformers 21, connected in the manner shown.

The various instrument transformer windings are connected in such relative direction that when voltage of normal phase sequence is applied to the circuit 2, the voltage network 26 supplies a positive phase-sequence voltage component, and the current network 25 supplies a positive phase-sequence current component to the coil of relay 17b and the current coils 14 of relay 7 and a negative phase sequence current component to the coil of relay 17a. The coils of relay 7 are connected in such relative direction that the torque of the relay tends to cause engagement of contact members 5 and 6 (tripping contacts) in response to reversed positive phase sequence power.

The operation of the above described apparatus may be set forth as follows: The switch 22 is closed to complete a circuit for the closing coil 20 to thereby close the circuit breaker 1. The circuit 2 now draws polyphase current of magnitude, unbalance factor and phase relationship determined by the character of its connected load.

If the load on circuit 2 increases, the positive current phase sequence components increase, and upon the occurrence of a predetermined load, the over-current relay 17b closes to complete a circuit for the voltage winding 15 of relay 7. As long as the direction of power flow is proper, i. e., left to right in the figure, the torque of the relay 7 is incorrect to cause a tripping operation and the contact member 5 remains disengaged from the contact member 6.

If the unbalance factor of the load is increased by loading one phase more than another, a negative phase-sequence current component flows in the relay 17a. Upon the occurrence of a predetermined degree of unbalance, the relay 17a closes. However, if the direction of power flow is still proper, no tripping operation occurs.

If the power flow in circuit 2 now falls to zero, the relays 17a and 17b drop out. If a power reversal now occurs in the circuit 2, so that the direction of power flow is from right to left, and either the negative phase-sequence current component or the positive phase-sequence current component increases to sufficient value to close one of the relays 17a and 17b, respectively, the relay 7 operates with definite or variable time delay, as described in connection with Fig. 1, to complete a circuit for the trip coil 3. The circuit breaker 1 now trips open.

A reversal of power in the circuit 2, as described above, may result from a regenerative operation of a dynamo-electric machine fed from circuit 2, a synchronizing operation, a fault or from other disturbances. Assuming that it is caused by a regenerative operation or a synchronizing operation, the value of reverse current is, in general, lower than that which is caused by the back-feed to a fault. The relay 17b may, if desired, be of such design that it responds only to fault currents, or may, if desired, be sensitive enough to respond to a comparatively low reverse current equivalent to the exciting current of a transformer. The relay 17a may be so chosen that a tripping operation results from any desired degree of unbalance of the reverse current.

I do not intend that the present invention shall be restricted to the specific structural details, arrangement of parts or circuit connections herein set forth, as various modifications thereof may be effected without departing from the spirit and scope of my invention. I desire therefore, that only such limitatons shall be imposed as are indicated in the appended claims.

I claim as my invention:

1. In a polyphase alternating-current network system of the type in which an unbalanced electrical condition is produced on a feeder to cause the opening of network circuit breakers connected thereto, a network circuit breaker, control means for said circuit breaker including a fault-detecting device responsive to a predetermined abnormal condition dependent at least partially upon a voltage condition, said device having a voltage connection, means for segregating a negative phase sequence condition of the current traversing said circuit breaker, and a relay responsive to the segregated negative phase sequence current condition for controlling said voltage connection.

2. In protective apparatus for a polyphase alternating-current circuit, a circuit breaker for controlling said circuit, a power responsive relay operable with time delay for controlling said circuit breaker, said relay having current winding means and voltage winding means, means for continuously energizing said current winding means in accordance with a current condition of said circuit, means for connecting said voltage winding means for energization in accordance with a voltage condition of said circuit when said circuit is in a predetermined unbalanced electrical condition, and means for connecting said voltage winding means for energization in accordance with said voltage condition when a current condition of said circuit exceeds a predetermined value, whereby said relay is operable with time delay in response to a power condition of said circuit when either a predetermined unbalanced condition or a predetermined current condition of said circuit exists.

3. In protective apparatus for a polyphase alternating-current circuit, a circuit breaker for controlling said circuit, a power responsive relay operable with time delay for controlling said circuit breaker, said relay having current winding means and voltage winding means, means for continuously energizing said current winding means in accordance with a current condition of said circuit, means responsive to a positive symmetrical component of the polyphase current of said circuit for connecting said voltage winding means for energization in accordance with a voltage condition of said circuit when said positive component exceeds a predetermined value, and means responsive to a negative symmetrical component of the polyphase current of said circuit for connecting said voltage winding means for energization in accordance with said voltage condition when said negative component exceeds a predetermined value.

4. In protective apparatus for a polyphase alternating-current circuit, a circuit breaker for controlling said circuit, a power responsive relay operable with time delay for controlling said circuit breaker, said relay having a current winding and a voltage winding, means for continuously energizing said current winding in accordance with a symmetrical component of the polyphase current of said circuit, means for segregating a symmetrical component of the polyphase voltage of said circuit, means for connecting said voltage winding for energization in accordance with said symmetrical voltage component when a predetermined unbalanced condition of said circuit exists, and means for connecting said voltage winding for energization in accordance with said symmetrical voltage component when a current condition of said circuit exceeds a predetermined value, whereby said relay is operable with time delay in response to a power condition of said circuit when either a predetermined unbalanced condition or a predetermined current condition of said circuit exists.

5. In protective apparatus for a polyphase alternating-current circuit, a circuit breaker for controlling said circuit, a power responsive relay operable with time delay for controlling said circuit breaker, said relay having a current winding and a voltage winding, means for continuously energizing said current winding in accordance with a positive symmetrical component of the current of said circuit, means for segregating a positive symmetrical component of the polyphase voltage of said circuit, means responsive to a positive symmetrical component of the current of said circuit for connecting said voltage winding for energization in accordance with said voltage component, and means responsive to a negative symmetrical component of the current of said circuit for connecting said voltage winding for energization in accordance with said voltage component.

MYRON A. BOSTWICK.